United States Patent
Hayashi et al.

(10) Patent No.: US 10,978,991 B2
(45) Date of Patent: *Apr. 13, 2021

(54) PANEL CONNECTED BODY, POWER GENERATION MODULE CONNECTED BODY, PHOTOELECTRIC CONVERSION MODULE CONNECTED BODY, AND POWER GENERATION DEVICE

(71) Applicant: ZEON CORPORATION, Chiyoda-ku Tokyo (JP)

(72) Inventors: Yuki Hayashi, Tokyo (JP); Kiyoshige Kojima, Tokyo (JP); Masayoshi Yoshida, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 145 days.

This patent is subject to a terminal disclaimer.

(21) Appl. No.: 16/098,875

(22) PCT Filed: May 12, 2017

(86) PCT No.: PCT/JP2017/018103
§ 371 (c)(1),
(2) Date: Nov. 5, 2018

(87) PCT Pub. No.: WO2017/199890
PCT Pub. Date: Nov. 23, 2017

(65) Prior Publication Data
US 2019/0140584 A1     May 9, 2019

(30) Foreign Application Priority Data
May 17, 2016   (JP) .............................. JP2016-098911

(51) Int. Cl.
*H02S 30/20* (2014.01)
*H02S 40/36* (2014.01)

(52) U.S. Cl.
CPC .............. *H02S 30/20* (2014.12); *H02S 40/36* (2014.12)

(58) Field of Classification Search
CPC ........... H02S 30/00; H02S 30/20; H02S 40/36
See application file for complete search history.

(56) References Cited

U.S. PATENT DOCUMENTS

2015/0075583 A1*  3/2015  Francis .................. H02S 30/20
                                                         136/245
2015/0083191 A1*  3/2015  Gmundner ............. H02S 30/20
                                                         136/245

FOREIGN PATENT DOCUMENTS

JP     S60147150 A    8/1985
JP     H0244356 U    3/1990
(Continued)

OTHER PUBLICATIONS

Jun. 27, 2017, International Search Report issued in the International Patent Application No. PCT/JP2017/018103.

(Continued)

*Primary Examiner* — Lindsey A Bernier
(74) *Attorney, Agent, or Firm* — Kenja IP Law PC

(57) ABSTRACT

A panel connected body comprises: a plurality of thin panels arranged in a matrix of m rows and n columns; and a connection portion connecting the plurality of thin panels in a row direction and a column direction, wherein the panel connected body is foldable between adjacent thin panels of the plurality of thin panels. The connection portion has, alternately in the column direction, a first type row satisfying relationships $D_1 \geq 2L$ and $D_y \geq D_{y-1}+2L$ and a second type row satisfying relationships $D_n \geq 2L$ and $D_y \geq D_{y+1}+2L$, where $D_y$ is a length of the connection portion between thin panels P (Continued)

adjacent in the column direction at a yth column, and L is a thickness of each of the plurality of thin panels in a vertical direction.

6 Claims, 12 Drawing Sheets

(56)  References Cited

FOREIGN PATENT DOCUMENTS

| JP | H0951118 A | 2/1997 |
| JP | 2007032171 A | 2/2007 |
| JP | 2015088561 A | 5/2015 |

OTHER PUBLICATIONS

Nov. 20, 2018, International Preliminary Report on Patentability issued in the International Patent Application No. PCT/JP2017/018103.

Nov. 8, 2019, the Extended European Search Report issued by the European Patent Office in the corresponding European Patent Application No. 17799314.4.

* cited by examiner

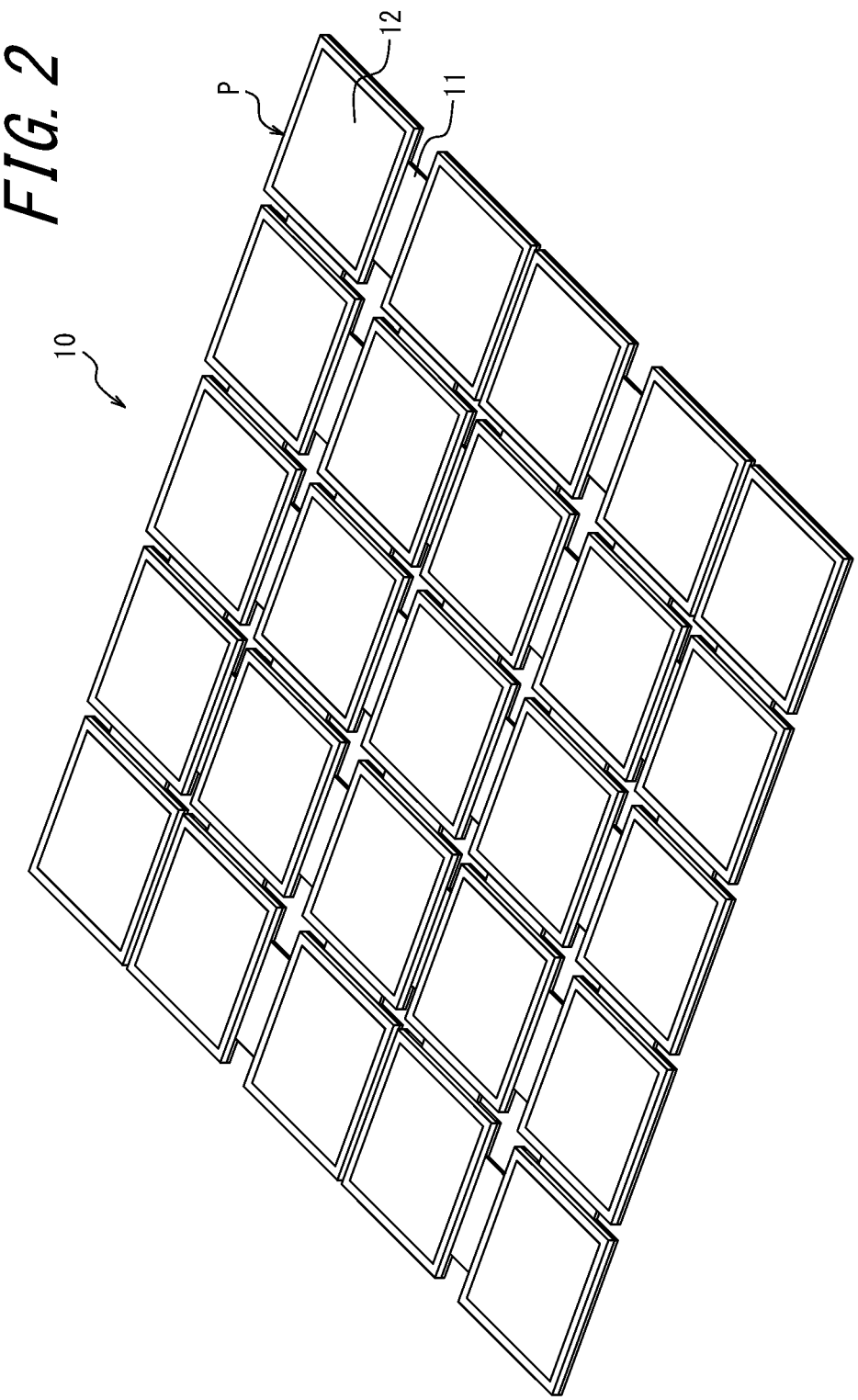

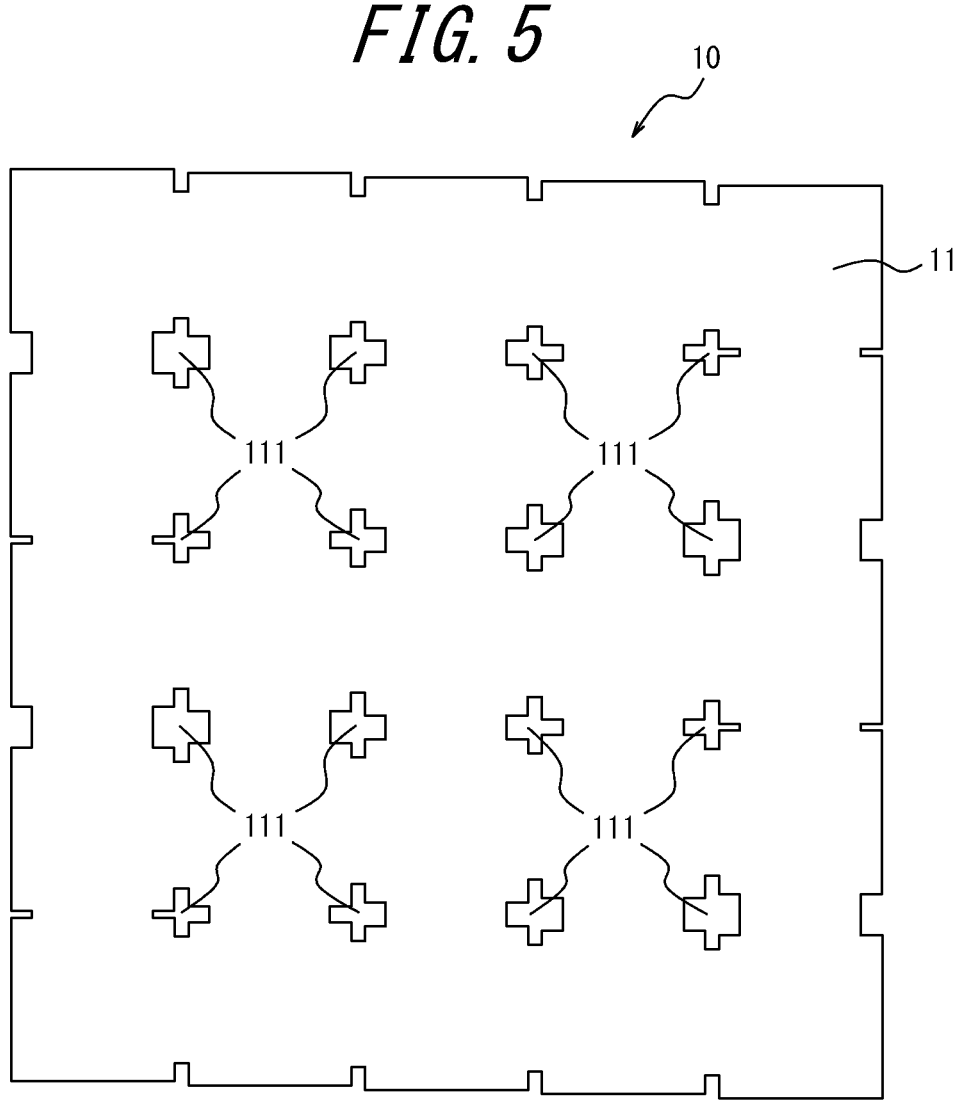

PANEL CONNECTED BODY, POWER GENERATION MODULE CONNECTED BODY, PHOTOELECTRIC CONVERSION MODULE CONNECTED BODY, AND POWER GENERATION DEVICE

TECHNICAL FIELD

The present disclosure relates to a panel connected body, a power generation module connected body, a photoelectric conversion module connected body, and a power generation device.

BACKGROUND

In recent years, there has been growing demand for portable power generation devices to enable users to use mobile devices such as smartphones, notebook personal computers (PCs), and tablet PCs even when they are outside with no access to a commercial power supply.

For example, JP H9-51118 A (PTL 1) discloses a sheet-shaped solar cell (photoelectric conversion module connected body) in which a plurality of solar cells (photoelectric conversion modules) arranged with a predetermined spacing and a flexible conductive member (connection portion) connecting electrodes of the solar cells are sandwiched vertically between sheet-shaped transparent film members having flexibility and elasticity. When in use, the photoelectric conversion module connected body can be unfolded to extract electric power generated by the photoelectric conversion modules and use the electric power in an external device. When not in use, the sheet-shaped solar cell can be folded to be easily stored or carried.

There are other foldable panel connected bodies besides photoelectric conversion module connected bodies. For example, JP 2007-32171 A (PTL 2) discloses a foldable board (panel connected body) configured to sequentially increase or decrease the widths of gussets corresponding to laterally extending folds. Such a panel connected body can be conveniently stored or transported in a folded state even though it has a certain thickness.

CITATION LIST

Patent Literatures

PTL 1: JP H9-51118 A
PTL 2: JP 2007-32171 A

SUMMARY

Technical Problem

The photoelectric conversion module connected body disclosed in PTL 1 can be folded and stored when not in use, as described above. However, the photoelectric conversion module connected body is only intended to be folded in one direction (column direction), and has room for improvement in storability. The panel connected body disclosed in PTL 2 has the gusset widths defined based on the thickness of the board, but has room for improvement in storability in a folded state.

It could be helpful to provide a panel connected body, a power generation module connected body, a photoelectric conversion module connected body, and a power generation device having improved storability in a folded state.

Solution to Problem

A presently disclosed panel connected body comprises: a plurality of thin panels arranged in a matrix of m rows and n columns, where $m \geq 2$ and $n \geq 2$; and a connection portion connecting the plurality of thin panels in a row direction and a column direction. The panel connected body is foldable between adjacent thin panels of the plurality of thin panels. The connection portion has, alternately in the column direction, a first type row satisfying relationships $D_1 \geq 2L$ and $D_y \geq D_{y-1} + 2L$ and a second type row satisfying relationships $D_n \geq 2L$ and $D_y \geq D_{y+1} + 2L$, where $D_y$ is a length of the connection portion between thin panels adjacent in the column direction at a yth column, and L is a thickness of each of the plurality of thin panels in a vertical direction. With such a structure, the panel connected body can be smoothly folded without being obstructed by the part of the connection portion located on the inner side during the folding. Such a panel connected body has improved storability in a folded state.

Preferably, in the presently disclosed panel connected body, the connection portion further has a through region passing through the connection portion in the vertical direction, at a position of an intersection point of folds in a state in which the panel connected body is folded between adjacent thin panels in the row direction and the column direction. With such a structure, the connection portion is unlikely to become an obstacle when putting the panel connected body in a stored state, so that the panel connected body can be folded more smoothly. Hence, the storability in a folded state can be further improved.

Preferably, in the presently disclosed panel connected body, the connection portion has, alternately in the row direction, a first type column satisfying relationships $C_1 \geq 2L$ and $C_x \geq C_{x-1} + 2L$ and a second type column satisfying relationships $C_m \geq 2L$ and $C_x \geq C_{x+1} + 2L$, where $C_x$ is a length of the connection portion between thin panels adjacent in the row direction at an xth row. With such a structure, the panel connected body can be folded in any of the row direction and the column direction to be in a stored state.

Preferably, in the presently disclosed panel connected body, in the connection portion, a first row is the first type row and a first column is the second type column, or the first row is the second type row and the first column is the first type column. With such a structure, each thin panel is prevented from being far from both of a thin panel adjacent in the row direction and a thin panel adjacent in the column direction. The stability of the thin panels can thus be improved.

A presently disclosed power generation module connected body comprises the panel connected body, wherein the plurality of thin panels are power generation modules, and the connection portion includes a conductor electrically connecting the power generation modules. With such a structure, the same advantageous effects as above can be achieved in a power generation module connected body.

Preferably, in the presently disclosed power generation module connected body, the connection portion is located along a lower end of the power generation module connected body, and further includes a conductor layer and a protective layer stacked in the vertical direction, and the protective layer is located closer to the lower end than the conductor layer. With such a structure, when the power generation module connected body is folded between adjacent power generation modules, the protective layer or the power generation module is located on the inner side of the conductor layer. This prevents an excessive bending force on the conductor layer, and suppresses a break of the conductor.

A presently disclosed photoelectric conversion module connected body comprises the power generation module connected body, wherein the power generation modules are photoelectric conversion modules. With such a structure, the same advantageous effects as above can be achieved in a photoelectric conversion module connected body.

A presently disclosed power generation device comprises: the power generation module connected body; and a main body electrically connected to the power generation module connected body. With such a structure, the same advantageous effects as above can be achieved in a power generation device.

Advantageous Effect

It is therefore possible to provide a panel connected body, a power generation module connected body, a photoelectric conversion module connected body, and a power generation device having improved storability in a folded state.

BRIEF DESCRIPTION OF THE DRAWINGS

In the accompanying drawings:

FIG. 2 is a perspective view of a power generation module connected body illustrated in FIG. 1 in an unfolded state;

FIG. 5 is a bottom view of the power generation module connected body illustrated in FIG. 1 in an unfolded state;

DETAILED DESCRIPTION

One of the disclosed embodiments is described below.

Figure 3A:
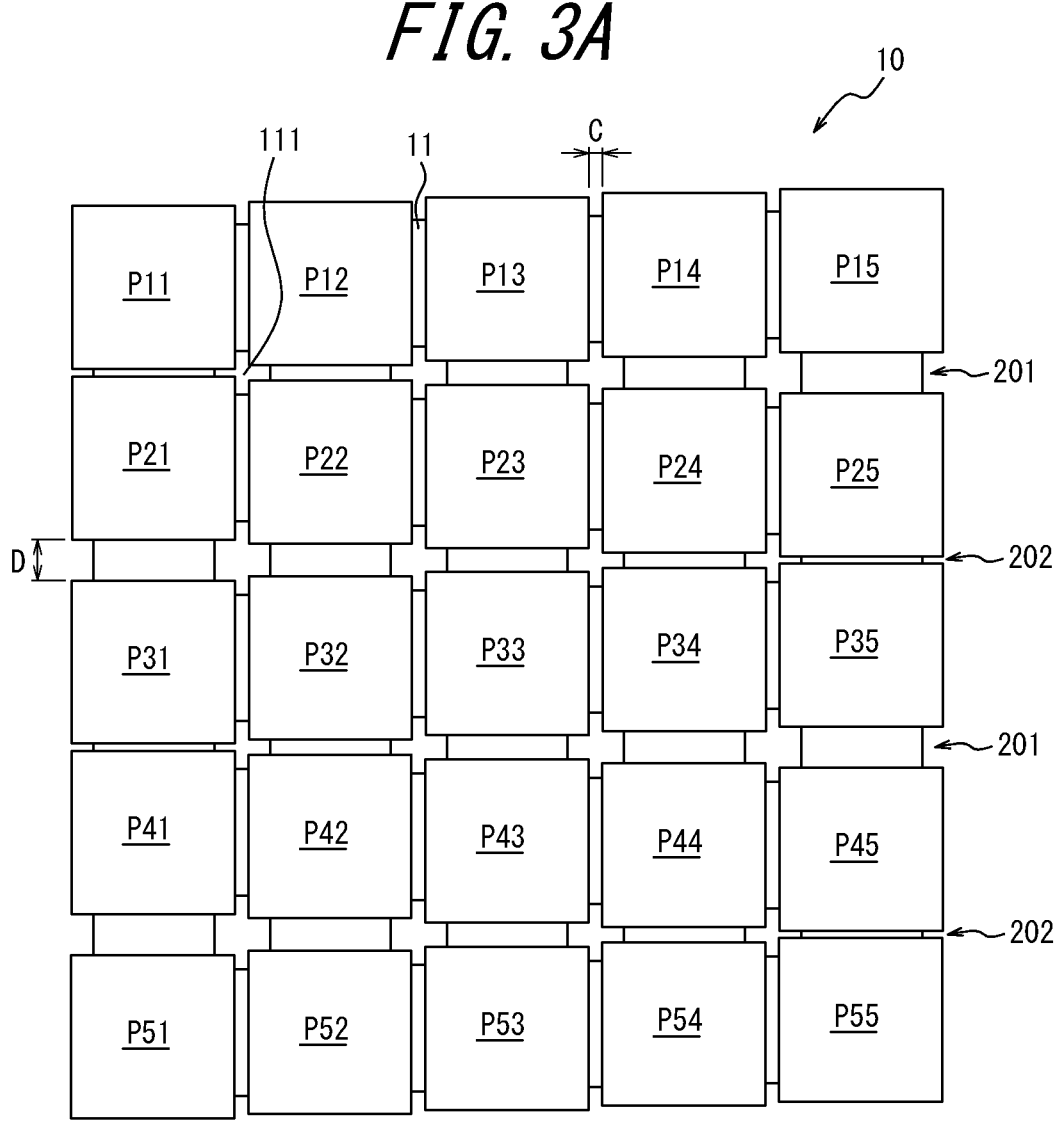
FIG. 3A is a top view of the power generation module connected body illustrated in FIG. 1 in an unfolded state.

Herein, the term "vertical direction" refers to the direction perpendicular to the paper surface of a top view of a power generation module connected body in FIG. 3A, etc. The term "upward" refers to the direction to the front from the paper surface in the drawing, and the term "downward" refers to the direction opposite to the upward direction. The term "front side" refers to the upward facing side of the power generation module connected body in an unfolded state, and the term "back side" refers to the side opposite to the front side. The term "row direction" refers to the rightward direction in a top view of a power generation module connected body in FIG. 3A, etc., and the term "column direction" refers to the downward direction in the top view.

Figure 1:
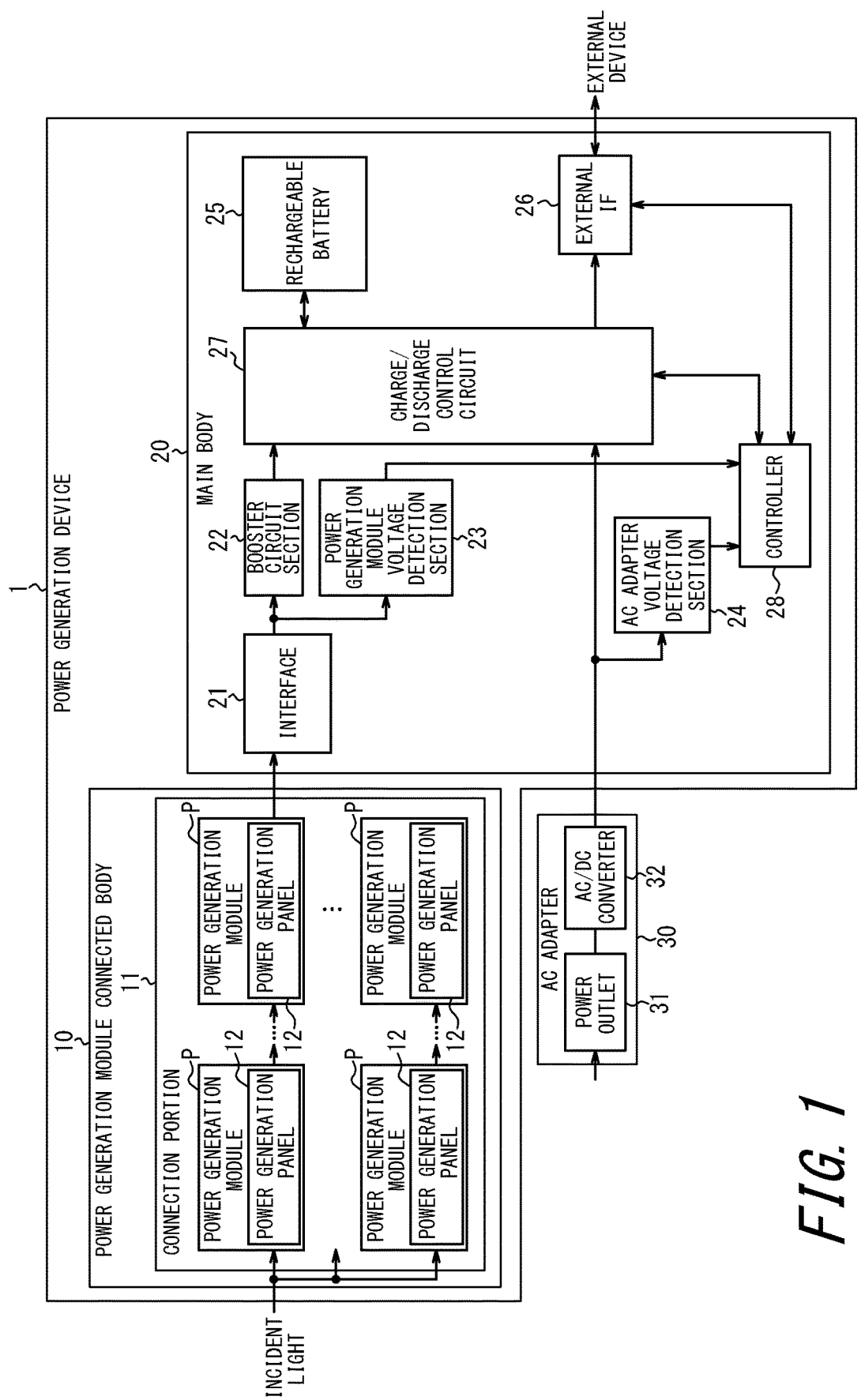
FIG. 1 is a block diagram illustrating the schematic structure of a power generation device according to one of the disclosed embodiments.

A power generation device 1 according to one of the disclosed embodiments is described in detail below, with reference to FIGS. 1 to 10B. FIG. 1 is a block diagram illustrating the schematic structure of the power generation device 1 according to one of the disclosed embodiments.

The power generation device 1 according to this embodiment includes a power generation module connected body 10 and a main body 20. The power generation device 1 can be supplied with power from a commercial power supply via an AC adapter 30. The AC adapter 30 includes a power outlet 31 and an AC/DC converter 32. The AC/DC converter 32 receives input of an AC voltage from the commercial power supply via the power outlet 31, converts the input AC voltage to a DC voltage, and supplies the DC voltage to the main body 20.

The power generation module connected body 10 includes a plurality of power generation modules P and a connection portion 11. The connection portion 11 mechanically and electrically connects the power generation modules P to each other.

Each power generation module P includes a power generation panel 12. The power generation panel 12 is a panel-shaped member. The power generation panel 12 is, for example, a solar cell panel including a solar cell that photoelectrically converts incident light, such as sunlight or room light, and outputs electric power. The power generation panel 12 is not limited to a solar cell panel, and may be a panel that generates electric power using energy other than incident light. The power generation module P includes a substrate (not illustrated) for supporting the power generation panel 12, extraction wiring (not illustrated) for extracting electric power generated by the power generation panel 12, and the like, in addition to the power generation panel 12.

The solar cell included in the solar cell panel used as the power generation panel 12 is broadly classified into two types: inorganic solar cells in which an inorganic material is used and organic solar cells in which an organic material is used. Examples of inorganic solar cells include Si solar cells in which silicon (Si) is used and compound solar cells in which a compound is used. Examples of organic solar cells include thin-film solar cells such as low-molecular vapor deposition-type solar cells in which an organic pigment is used, polymer coating-type solar cells in which a conductive polymer is used, and coating-conversion-type solar cells in which a conversion-type semiconductor is used; and dye-sensitized solar cells formed from titania, an organic dye, and an electrolyte. Other examples of the solar cell included in the solar cell panel include organic/inorganic hybrid solar cells and solar cells in which a perovskite compound is used. In the present disclosure, a thin panel-shaped solar cell panel is used, and a dye-sensitized solar cell formed using a plastic film or the like is preferable. The thin panel-shaped solar cell panel is not limited to a panel formed using a plastic film or the like, and may be any type as long as it is a similar thin panel.

The main body 20 includes an interface 21, a booster circuit section 22, a power generation module voltage detection section 23, an AC adapter voltage detection section 24, a rechargeable battery 25, an external interface (IF) 26, a charge/discharge control circuit 27, and a controller 28.

The interface 21 is a device for mechanically and electrically connecting each power generation module P to the main body 20. The interface 21 may connect the power generation module P removably. The interface 21 outputs electric power supplied from the connected power generation module P, to the booster circuit section 22.

The booster circuit section 22 boosts the voltage of the electric power supplied from the power generation module P via the interface 21 to a predetermined voltage required for charging the rechargeable battery 25, and outputs the resultant voltage to the charge/discharge control circuit 27.

The power generation module voltage detection section 23 detects a voltage (power generation module voltage) supplied from the power generation module P connected to the interface 21 of the main body 20 to the booster circuit section 22 via the interface 21, and outputs the result of the detection to the controller 28.

The AC adapter voltage detection section 24 detects a voltage (AC adapter voltage) supplied from the AC adapter 30 to the charge/discharge control circuit 27, and outputs the result of the detection to the controller 28.

The rechargeable battery 25 is a battery that can be charged and discharged, such as a lead-acid battery or a lithium ion secondary battery.

The external interface (IF) 26 is an interface capable of connecting to an external device and supplying electric power to the connected external device. The external IF 26 is not limited, and is, for example, a connector (USB connector) using a USB (Universal Serial Bus) interface or a cable having a connector at its end. The external IF 26 connects to the external device and, for example in response to a charging request from the external device, supplies electric power to the external device. The power generation device 1 can be mechanically and electrically attached to and removed from various devices to be charged, such as a mobile phone, a smartphone, a tablet device, and a personal computer, via the external IF 26.

The charge/discharge control circuit 27 performs charge/discharge control among the booster circuit section 22, the AC adapter 30, the rechargeable battery 25, and the external device connected via the external IF 26.

The controller 28 controls operation of each section of the main body 20. For example, the controller 28 controls the charge/discharge control circuit 27 to control paths for charging and discharging, based on the detection result of the power generation module voltage detection section 23, the detection result of the AC adapter voltage detection section 24, the charge level of the rechargeable battery 25, and so on.

Figure 3B:
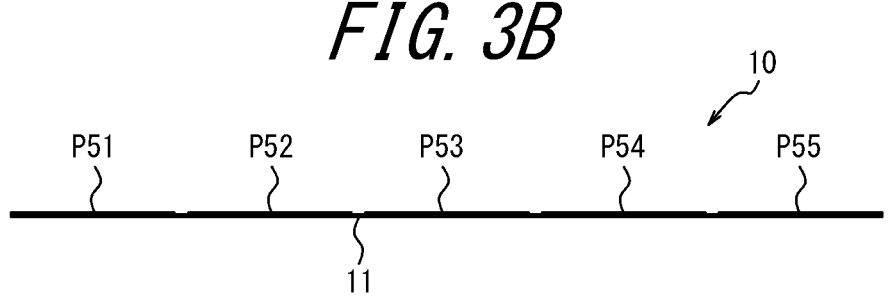
FIG. 3B is a front view of the power generation module connected body illustrated in FIG. 1 in an unfolded state.
Figure 4A:
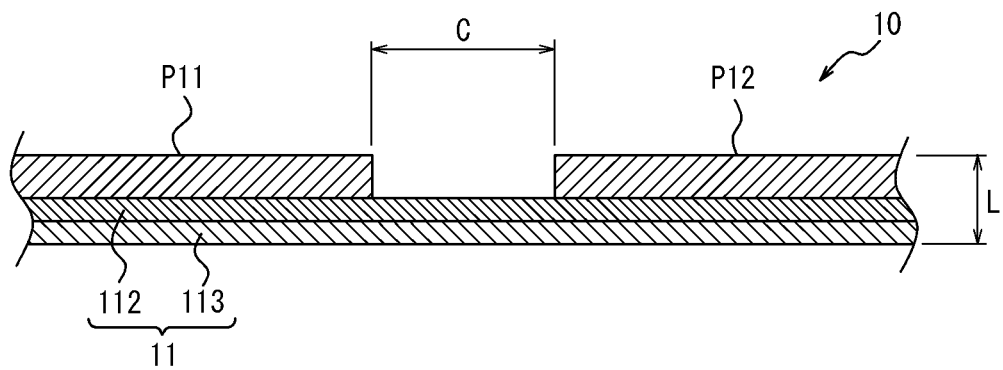
FIG. 4A is a partially enlarged sectional view of the power generation module connected body illustrated in FIG. 1 in an unfolded state.
Figure 4B:
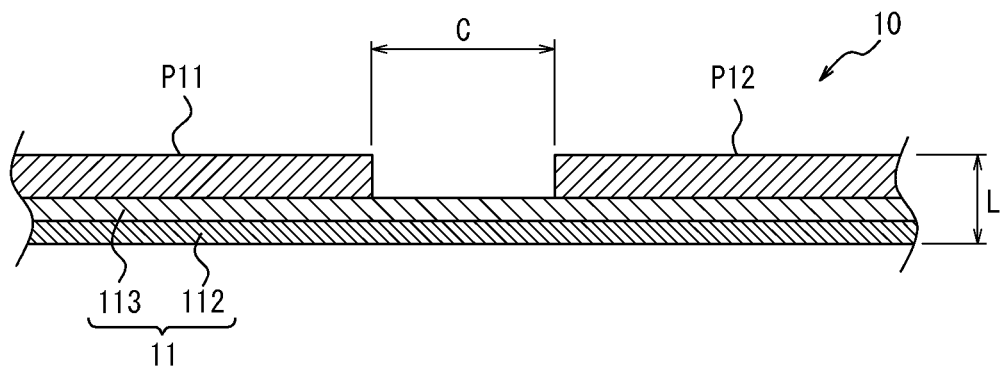
FIG. 4B is a partially enlarged sectional view of the power generation module connected body illustrated in FIG. 1 in an unfolded state.
Figure 4C:
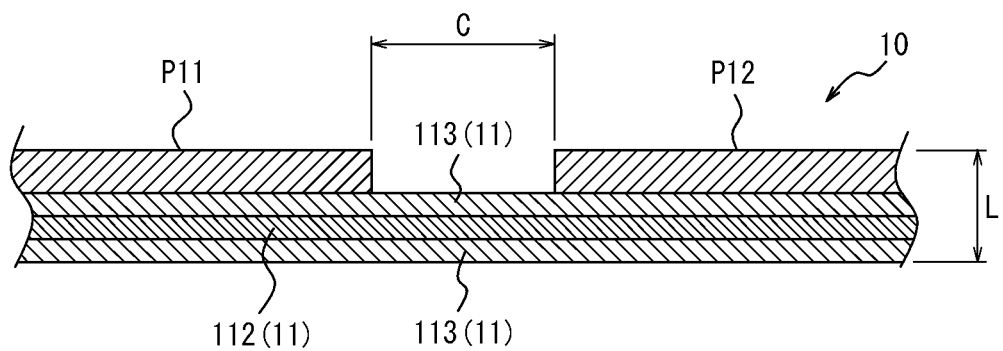
FIG. 4C is a partially enlarged sectional view of the power generation module connected body illustrated in FIG. 1 in an unfolded state.

The structure of the power generation module connected body 10 included in the power generation device 1 is described in more detail below, with reference to FIGS. 2 to 5. FIGS. 2 to 5 are each a view of the power generation module connected body 10 according to this embodiment in an unfolded state. FIG. 2 is a perspective view, FIG. 3A is a top view, FIG. 3B is a front view, FIGS. 4A to 4C are partially enlarged sectional views along the row direction, and FIG. 5 is a bottom view.

Herein, the "unfolded state" is a state in which, in order to generate electric power using the power generation device 1, the power generation modules P are unfolded to be planar as a whole so as not to overlap each other. In contrast to the unfolded state, the "stored state" refers to a state in which, in order to store the power generation device 1, adjacent power generation modules P are folded so that all power generation modules P overlap in the vertical direction, as described later with reference to FIGS. 8A and 8B. The unfolded state and the stored state are defined for the sake of convenience, to describe the state of the power generation module connected body 10. The power generation module connected body 10 may be used for power generation with part of the power generation modules P being folded, or stored with part of the power generation modules P being not folded.

As illustrated in FIGS. 2 and 3A, the power generation module connected body 10 has the power generation modules P arranged in a matrix of 5 rows and 5 columns, in an unfolded state. The power generation modules P are mechanically and electrically connected by the connection portion 11 in the row direction and the column direction. Each power generation module P is shaped like a thin panel, and is rectangular in a top view in this example. Each power generation module P may be covered with a casing to provide environmental resistance. Although it is preferable that each power generation module P has a certain degree of flexibility, each power generation module P has at least such rigidity that is higher than that of the connection portion 11 between the power generation modules P and resists folding. Each power generation module P is preferably covered on its periphery with a frame which is a rigid member. By covering the power generation module P with such a frame, for example, flexural deformation of the power generation module P caused by stress from the connection portion 11 can be suppressed. As illustrated in FIG. 3A, the length of the connection portion 11 between power generation modules P adjacent in the row direction (hereafter referred to as "row direction width" as appropriate) is denoted by C, and the length of the connection portion 11 between power generation modules P adjacent in the column direction (hereafter referred to as "column direction width" as appropriate) is denoted by D.

Each power generation module P has the power generation panel 12 exposed upward, as illustrated in FIG. 2. The power generation module P includes extraction wiring connected to the power generation panel 12. The power generation module P extracts electric power generated by the power generation panel 12 through the extraction wiring, and outputs the electric power to, for example, the interface 21 of the main body 20 via the connection portion 11 and other power generation modules P. The power generation panel 12 in the power generation module P may be disposed to be capable of receiving incident light in a direction other than from above, for example, from below.

The connection portion 11 is a flexible film member. The connection portion 11 mechanically connects the power generation modules P in the row direction and the column direction, and is configured so that the power generation modules P connected via the connection portion 11 are foldable. The connection portion 11 preferably has higher flexibility than the power generation modules P, in terms of foldability. The connection portion 11 includes a conductor (not illustrated) that electrically connects the power generation modules P. The conductor is located to electrically connect any adjacent power generation modules P to each other. The thickness of the connection portion 11 in the vertical direction is not greater than the thickness of the power generation module P in the vertical direction. The thickness of the connection portion 11 in the vertical direction is preferably less than the thickness of the power generation module P in the vertical direction, as illustrated in FIGS. 4A to 4C.

As illustrated in FIGS. 4A to 4C, preferably the connection portion 11 is located along the lower end of the power generation module connected body 10 and includes a conductor layer 112 and a protective layer 113 stacked in the vertical direction. The conductor layer 112 is a layer including a conductor, and is composed of, for example, a conductive member such as a conductive cable or a flexible board. The protective layer 113 is composed of, for example, a covering member for protecting and/or reinforcing the conductor layer 112. For example, the connection portion 11 may have the protective layer 113 and the conductor layer 112 arranged in this order upward from the lower end as illustrated in FIG. 4A, have the conductor layer 112 and the protective layer 113 arranged in this order upward from the lower end as illustrated in FIG. 4B, or have the protective layer 113, the conductor layer 112, and the protective layer 113 arranged in this order upward from the lower end as illustrated in FIG. 4C. In the case where the protective layer 113 is located closer to the lower end than the conductor layer 112 as illustrated in FIGS. 4A and 4C, when folding the power generation module connected body 10 between adjacent power generation modules P, the protective layer 113 or the power generation module P is located on the inner side of the conductor layer 112. This prevents an excessive bending force on the conductor layer 112, and suppresses a break of the conductor. In the case where the protective layer 113 is located above the conductor layer 112 as illustrated in FIGS. 4B and 4C, the conductor layer 112 can be further protected and/or reinforced.

The connection portion 11 is configured to satisfy the relationship "row direction width $C \geq 2L$", where L is the thickness of the power generation module P in the vertical direction as illustrated in FIGS. 4A to 4C. In the case where the connection portion 11 is present above or below the power generation module P, the thickness L of the power generation module P in the vertical direction is taken to be the thickness of the whole power generation module connected body 10 including the thickness of the connection portion 11, as illustrated in FIGS. 4A to 4C. For example, the thickness L of the power generation module P in the vertical direction is preferably 3 mm or less, in terms of production technology. The lower limit of the thickness of the power generation module P is preferably about 10 µm.

Let n be the number of columns of the power generation modules P arranged in a matrix. The connection portion 11 has, alternately in the column direction, a first type row 201 satisfying the relationships $D_1 \geq 2L$ and $D_y \geq D_{y-1}+2L$ and a second type row 202 satisfying the relationships $D_n \geq 2L$ and $D_y \geq D_{y+1}+2L$, where $D_y$ is the column direction width at the yth column and L is the thickness of the power generation module P in the vertical direction. In other words, the connection portion 11 has, alternately in the column direction, the first type row 201 in which the column direction width is 2L or more in the first column and increases by 2L or more sequentially from the first column and the second type row 202 in which the column direction width decreases by 2L or more sequentially from the first column and is 2L or more in the last column.

In detail, as illustrated in FIG. 3A, the length D of the connection portion 11 between the power generation modules P (P11, P12, P13, P14, P15) of the first row and the power generation modules P (P21, P22, P23, P24, P25) of the second row adjacent in the column direction satisfies the relationships $D_1 \geq 2L$, $D_2 \geq D_1+2L$, $D_3 \geq D_2+2L$, $D_4 \geq D_3+2L$, $D_5 \geq D_4+2L$ sequentially from the first column, forming the first type row 201. Likewise, the length D of the connection portion 11 between the power generation modules P (P31, P32, P33, P34, P35) of the third row and the power generation modules P (P41, P42, P43, P44, P45) of the fourth row adjacent in the column direction satisfies the relationships $D_1 \geq 2L$, $D_2 \geq D_1+2L$, $D_3 \geq D_2+2L$, $D_4 \geq D_3+2L$, $D_5 \geq D_4+2L$ sequentially from the first column, forming the first type row 201. Meanwhile, the length D of the connection portion 11 between the power generation modules P (P21, P22, P23, P24, P25) of the second row and the power generation modules P (P31, P32, P33, P34, P35) of the third row adjacent in the column direction satisfies the relationships $D_1 \geq D_2+2L$, $D_2 \geq D_3+2L$, $D_3 \geq D_4+2L$, $D_4 \geq D_5+2L$, $D_5 \geq 2L$ sequentially from the first column, forming the second type row 202. Likewise, the length D of the connection portion 11 between the power generation modules P (P41, P42, P43, P44, P45) of the fourth row and the power generation modules P (P51, P52, P53, P54, P55) of the fifth row adjacent in the column direction satisfies the relationships $D_1 \geq D_2+2L$, $D_2 \geq D_3+2L$, $D_3 \geq D_4+2L$, $D_4 \geq D_5+2L$, $D_5 \geq 2L$ sequentially from the first column, forming the second type row 202.

As illustrated in FIGS. 3A and 5, the connection portion 11 has a through region 111 passing through the connection portion 11 in the vertical direction, at a position of an intersection point of folds in a state in which the power generation module connected body 10 is folded between adjacent power generation modules P in the row direction and the column direction. Although the shape of the through region 111 is a cross in this embodiment as illustrated in FIG. 5, the shape is not limited to such, and may be any shape such as a circle, an ellipse, or a polygon.

A process in which the power generation module connected body 10 according to this embodiment is folded from an unfolded state to be in a stored state is described below, with reference to FIGS. 6A to 8B.

Figure 6A:
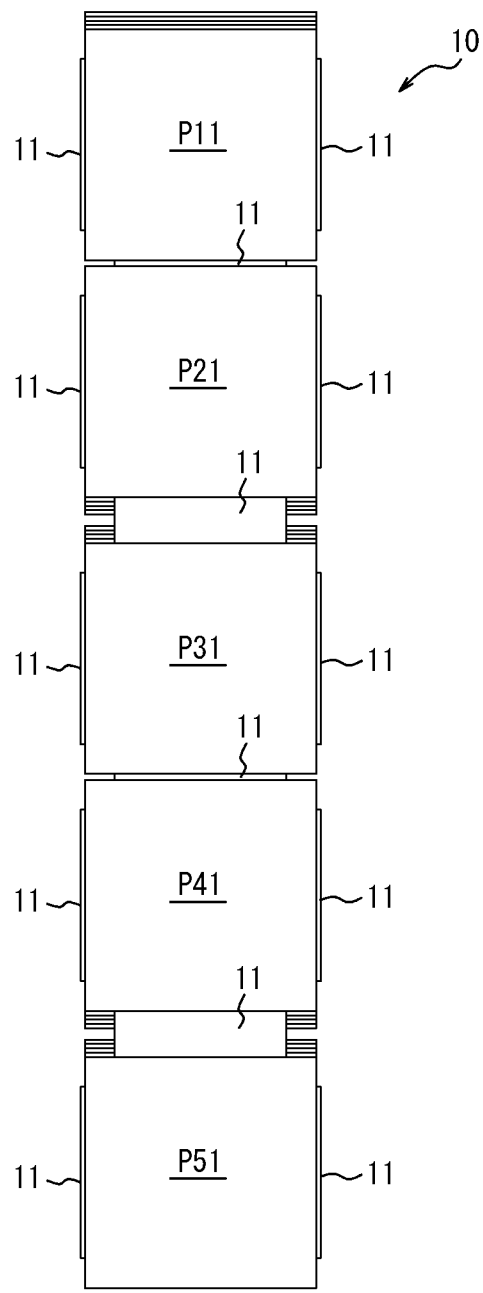
FIG. 6A is a top view of the power generation module connected body illustrated in FIG. 1 in a row direction folded state.
Figure 6B:
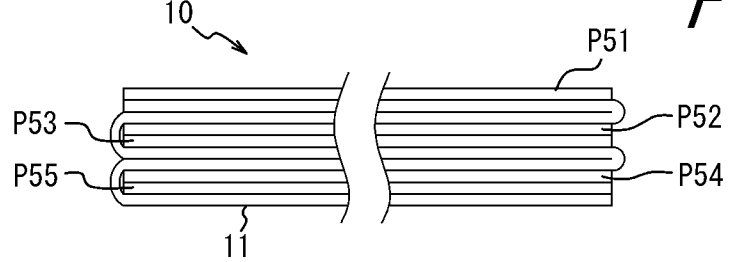
FIG. 6B is a front view of the power generation module connected body illustrated in FIG. 1 in a row direction folded state.

FIG. 6A is a top view of the power generation module connected body 10 in a state of being folded in the row direction (hereafter referred to as "row direction folded state" as appropriate). FIG. 6B is a front view of the power generation module connected body 10 in a state of being folded in the row direction. As a result of being folded in the row direction from the unfolded state illustrated in FIGS. 3A and 3B, the power generation module connected body 10 is put in a row direction folded state as illustrated in FIGS. 6A and 6B. In detail, as a result of alternate folding (i.e. accordion folding) in the row direction between power generation modules P of columns adjacent in the row direction, the power generation module connected body 10 is put in a row direction folded state. First, the power generation modules P (P11, P21, P31, P41, P51) of the first column are folded so as to overlap the back side of the power generation modules P (P12, P22, P32, P42, P52) of the second column (mountain folding). Next, the power generation modules P of the first and second columns overlapping in the vertical direction are folded so as to overlap the front side of the power generation modules P (P13, P23, P33, P43, P53) of the third column (valley folding). Next, the power generation modules P of the first to third columns overlapping in the vertical direction are folded so as to overlap the back side of the power generation modules P (P14, P24, P34, P44, P54) of the fourth column (mountain folding). Then, the power generation modules P of the first to fourth columns overlapping in the vertical direction are folded so as to overlap the front side of the power generation modules P (P15, P25, P35, P45, P55) of the fifth column (valley folding). By accordion-folding the power generation module connected body 10 in the row direction so as to alternate between mountain folding and valley folding in this way, the row direction folded state illustrated in FIGS. 6A and 6B can be achieved. The parts subjected to mountain folding and the parts subjected to valley folding may be replaced with each other.

The connection portion 11 is configured to satisfy the relationship "row direction width C≥2L". Accordingly, the length of the connection portion 11 between power generation modules P is sufficient in both of the parts subjected to mountain folding and the parts subjected to valley folding as illustrated in FIG. 6B, enabling smooth folding.

Figure 7:
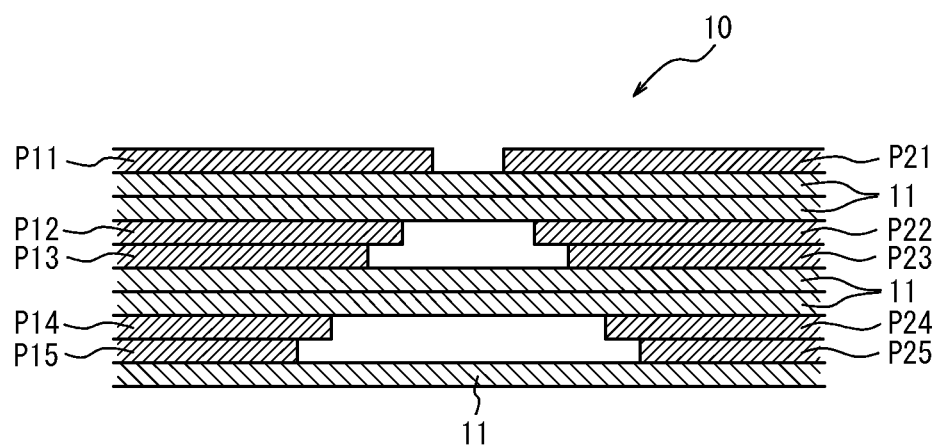
FIG. 7 is a partially enlarged sectional view of the power generation module connected body illustrated in FIG. 1 in a row direction folded state.

FIG. 7 is a partially enlarged sectional view of the power generation module connected body 10 in a row direction folded state, along the column direction. As illustrated in FIG. 7, folding is made so that the length D of the connection portion 11 between the power generation modules P of the first row and the power generation modules P of the second row adjacent in the column direction increases in the downward direction. Likewise, folding is made so that the length D of the connection portion 11 between the power generation modules P of the third row and the power generation modules P of the fourth row adjacent in the column direction increases in the downward direction (not illustrated). Meanwhile, folding is made so that the length D of the connection portion 11 between the power generation modules P of the second row and the power generation modules P of the third row adjacent in the column direction and between the power generation modules P of the fourth row and the power generation modules P of the fifth row adjacent in the column direction increases in the upward direction.

Figure 8A:
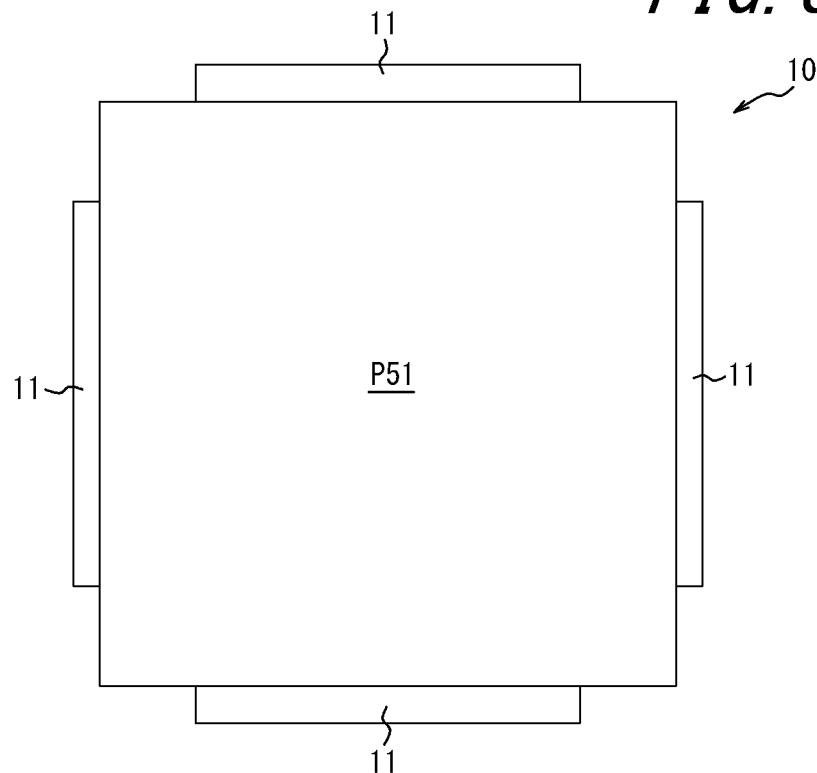
FIG. 8A is a top view of the power generation module connected body illustrated in FIG. 1 in a stored state.
Figure 8B:
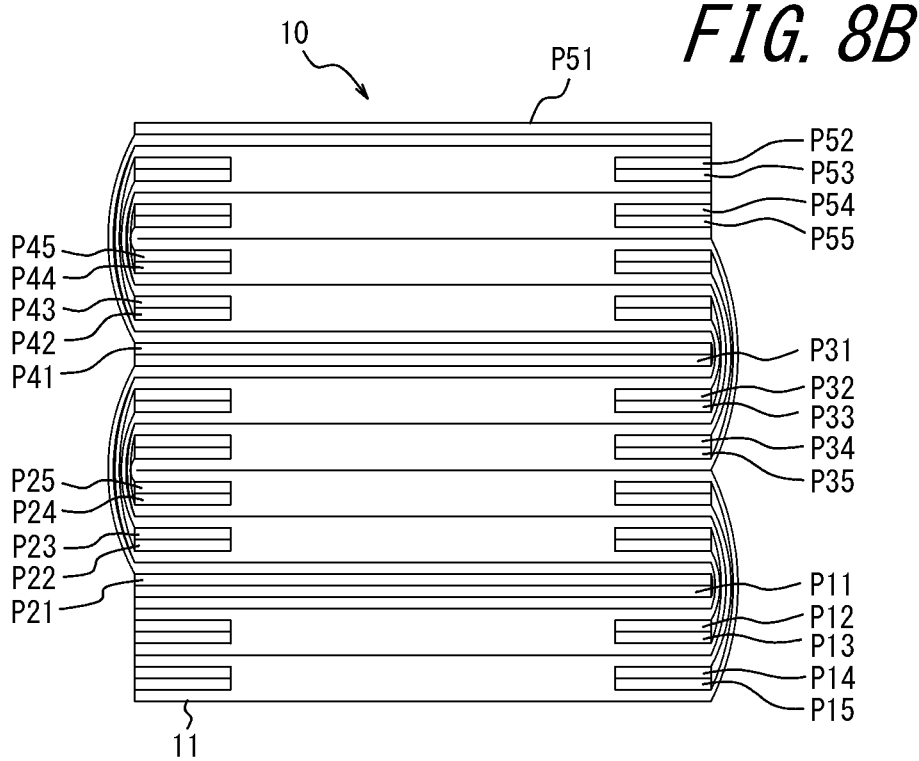
FIG. 8B is a side view of the power generation module connected body illustrated in FIG. 1 in a stored state.

FIG. 8A is a top view of the power generation module connected body 10 in a stored state. FIG. 8B is a side view of the power generation module connected body 10 in a stored state. As a result of accordion-folding the power generation modules P of the rows in the column direction from the row direction folded state illustrated in FIGS. 6A and 6B and overlapping all power generation modules P, the power generation module connected body 10 is put in a stored state illustrated in FIGS. 8A and 8B. First, the power generation modules P (P11, P12, P13, P14, P15) of the first row overlapping in the vertical direction are folded so as to overlap the front side of all of the power generation modules P (P21, P22, P23, P24, P25) of the second row overlapping in the vertical direction (valley folding). Next, the power generation modules P of the first and second rows overlapping in the vertical direction are folded so as to overlap the back side of all of the power generation modules P (P31, P32, P33, P34, P35) of the third row overlapping in the vertical direction (mountain folding). Next, the power generation modules P of the first to third rows overlapping in the vertical direction are folded so as to overlap the front side of all of the power generation modules P (P41, P42, P43, P44, P45) of the fourth row overlapping in the vertical direction (valley folding). Then, the power generation modules P of the first to fourth rows overlapping in the vertical direction are folded so as to overlap the back side of all of the power generation modules P (P51, P52, P53, P54, P55) of the fifth row overlapping in the vertical direction (mountain folding). By accordion-folding the power generation module connected body 10 in a row direction folded state in the column direction so as to alternate between mountain folding and valley folding in this way, the stored state illustrated in FIGS. 8A and 8B can be achieved.

When folding the power generation module connected body 10 from a row direction folded state to a stored state, the surfaces of adjacent power generation modules P can be made to overlap each other in the part in which the length D of the connection portion 11 between power generation modules P adjacent in the column direction increases in the downward direction as illustrated in FIG. 7. By such folding, the column direction width D between power generation modules P with a longer distance in the vertical direction in a folded state is longer, so that the power generation module connected body 10 can be folded smoothly. In more detail, the column direction width D of the connection portion 11 is 2L or more longer than the column direction width D of the connection portion 11 located immediately on the inner side in a folded state, and therefore smooth folding can be achieved without being obstructed by the part of the connection portion 11 located on the inner side. The storability in a folded state can thus be improved.

The connection portion 11 has the through region 111 passing through the connection portion 11 in the vertical direction, at a position of an intersection point of folds in a state in which the power generation module connected body 10 is folded between adjacent power generation modules P in the row direction and the column direction. The connection portion 11 is therefore unlikely to become an obstacle when putting the power generation module connected body 10 in a stored state, so that the power generation module connected body 10 can be folded more smoothly. Hence, the storability in a folded state can be further improved.

Figure 9:
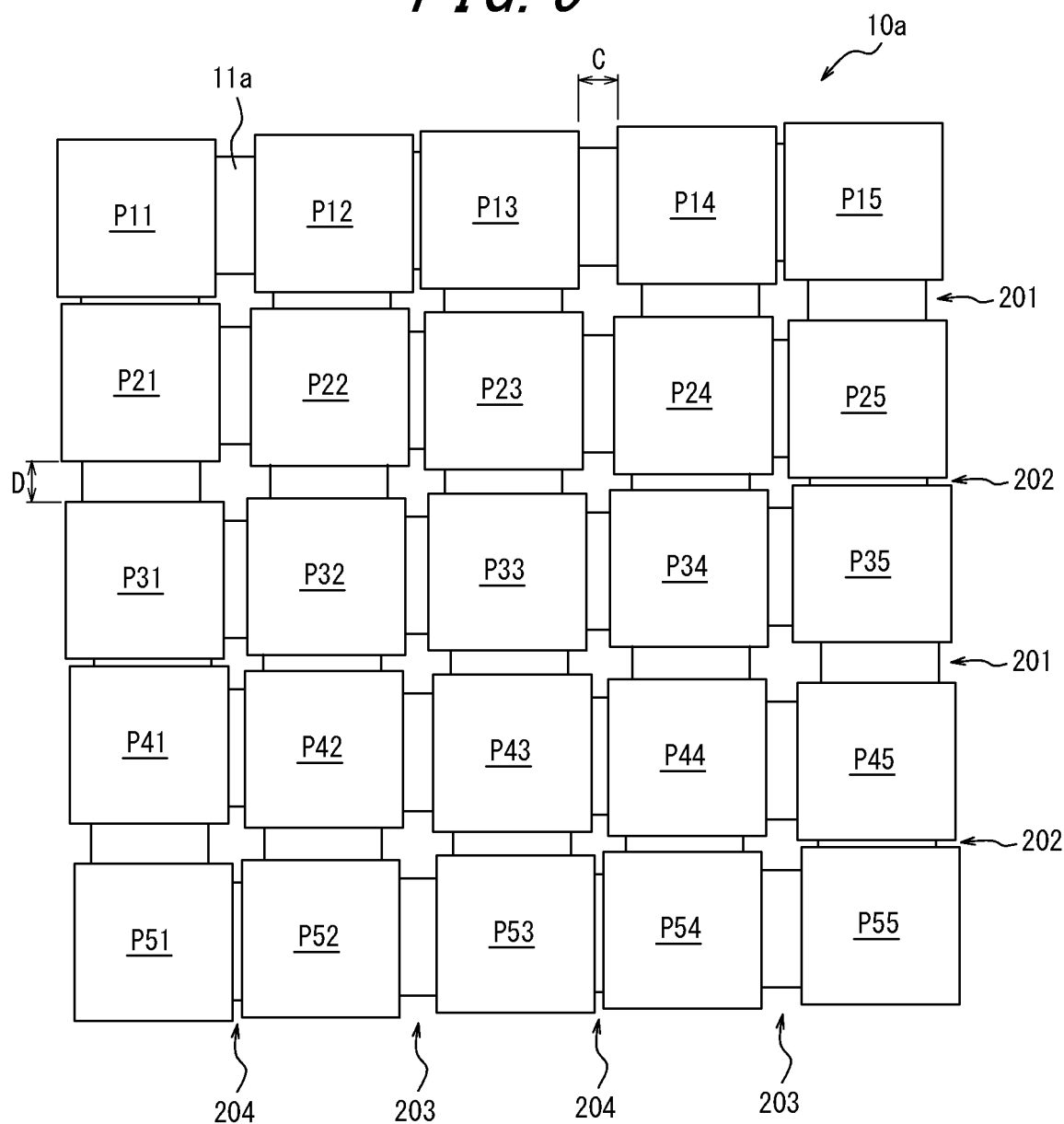
FIG. 9 is a top view of Modification 1 of the power generation module connected body illustrated in FIG. 1 in an unfolded state.

Modifications of the power generation module connected body 10 are described below. FIG. 9 is a top view of a power generation module connected body 10a according to Modification 1 of the power generation module connected body 10 in an unfolded state.

The power generation module connected body 10a is the same as the power generation module connected body 10, except that the row direction width C of a connection portion 11a satisfies the following relationships. The connection portion 11a has, alternately in the row direction, a first type column 203 satisfying the relationships $C_1 \geq 2L$ and $C_x \geq C_{x-1} + 2L$ and a second type column 204 satisfying the relationships $C_m \geq 2L$ and $C_x \geq C_{x+1} + 2L$, where m is the number of rows of the power generation modules P arranged in a matrix and $C_x$ is the row direction width of the connection portion 11a at the xth row. In other words, the connection portion 11a has, alternately in the row direction, the first type column 203 in which the row direction width is 2L or more in the first row and increases by 2L or more sequentially from the first row and the second type column 204 in which the row direction width decreases by 2L or more sequentially from the first row and is 2L or more in the last row.

The connection portion 11a satisfies the following condition: the first row is the first type row 201 and the first column is the second type column 204, or the first row is the second type row 202 and the first column is the first type column 203.

In detail, in the power generation module connected body 10a as illustrated in FIG. 9, the length C of the connection portion 11a between the power generation modules P (P11, P21, P31, P41, P51) of the first column and the power generation modules P (P12, P22, P32, P42, P52) of the second column adjacent in the row direction satisfies the relationships $C_1 \geq C_2+2L$, $C_2 \geq C_3+2L$, $C_3 \geq C_4+2L$, $C_4 \geq C_5+2L$, $C_5 \geq 2L$ sequentially from the first row, forming the second type column 204. Likewise, the length C of the connection portion 11a between the power generation modules P (P13, P23, P33, P43, P53) of the third column and the power generation modules P (P14, P24, P34, P44, P54) of the fourth column adjacent in the row direction satisfies the relationships $C_1 \geq C_2+2L$, $C_2 \geq C_3+2L$, $C_3 \geq C_4+2L$, $C_4 \geq C_5+2L$, $C_5 \geq 2L$ sequentially from the first row, forming the second type column 204. Meanwhile, the length C of the connection portion 11a between the power generation modules P (P12, P22, P32, P42, P52) of the second column and the power generation modules P (P13, P23, P33, P43, P53) of the third column adjacent in the row direction satisfies the relationships $C_1 \geq 2L$, $C_2 \geq C_1+2L$, $C_3 \geq C_2+2L$, $C_4 \geq C_3+2L$, $C_5 \geq C_4+2L$ sequentially from the first row, forming the first type column 203. Likewise, the length C of the connection portion 11a between the power generation modules P (P14, P24, P34, P44, P54) of the fourth column and the power generation modules P (P15, P25, P35, P45, P55) of the fifth column adjacent in the row direction satisfies the relationships $C_1 \geq 2L$, $C_2 \geq C_1+2L$, $C_3 \geq C_2+2L$, $C_4 \geq C_3+2L$, $C_5 \geq C_4+2L$ sequentially from the first row, forming the first type column 203.

The power generation module connected body 10a having the structure described above can be folded from any of the row direction and the column direction to be in a stored state, in addition to having the same advantageous effects as the power generation module connected body 10. Moreover, the connection portion 11a satisfies the condition that the first row is the first type row 201 and the first column is the second type column 204, or the first row is the second type row 202 and the first column is the first type column 203. Hence, each power generation module P is prevented from being far from both of a power generation module P adjacent in the row direction and a power generation module P adjacent in the column direction. The stability of the power generation modules P can thus be improved.

Figure 10A:
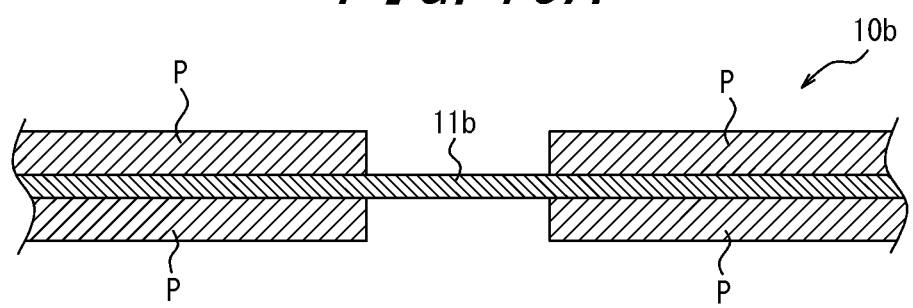
FIG. 10A is a partially enlarged sectional view of Modification 2 of the power generation module connected body illustrated in FIG. 1 in an unfolded state.

FIG. 10A is a partially enlarged sectional view of a power generation module connected body 10b according to Modification 2 of the power generation module connected body 10 in an unfolded state. The power generation module connected body 10b is the same as the power generation module connected body 10, except that the power generation modules P are located above and below a connection portion 11b. In addition to the same advantageous effects as the power generation module connected body 10, the power generation module connected body 10b has an effect of, when folding the power generation module connected body 10b between adjacent power generation modules P, reducing the burden on the connection portion 11b due to the folding, because the power generation modules P are located on the inner side of the connection portion 11b.

Figure 10B:
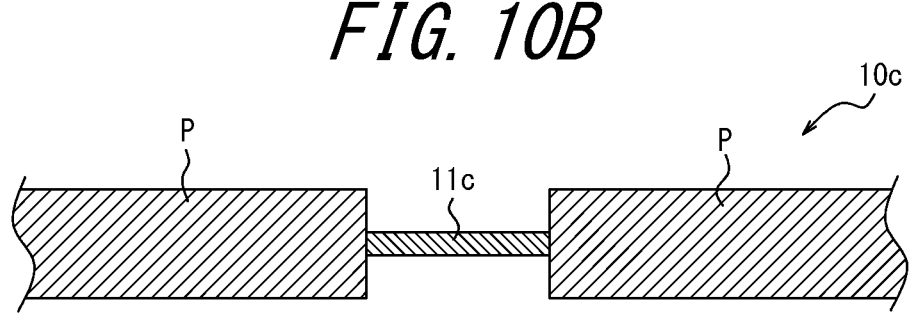
FIG. 10B is a partially enlarged sectional view of Modification 3 of the power generation module connected body illustrated in FIG. 1 in an unfolded state.

FIG. 10B is a partially enlarged sectional view of a power generation module connected body 10c according to Modification 3 of the power generation module connected body 10 in an unfolded state. The power generation module connected body 10c is the same as the power generation module connected body 10, except that a connection portion 11c is located to connect adjacent power generation modules P to each other near the vertical center of the power generation modules P. In addition to the same advantageous effects as the power generation module connected body 10, the power generation module connected body 10c has an effect of, when folding the power generation module connected body 10c between adjacent power generation modules P, reducing the burden on the connection portion 11c due to the folding, because the power generation modules P are located on the inner side of the connection portion 11c.

Figure 11:
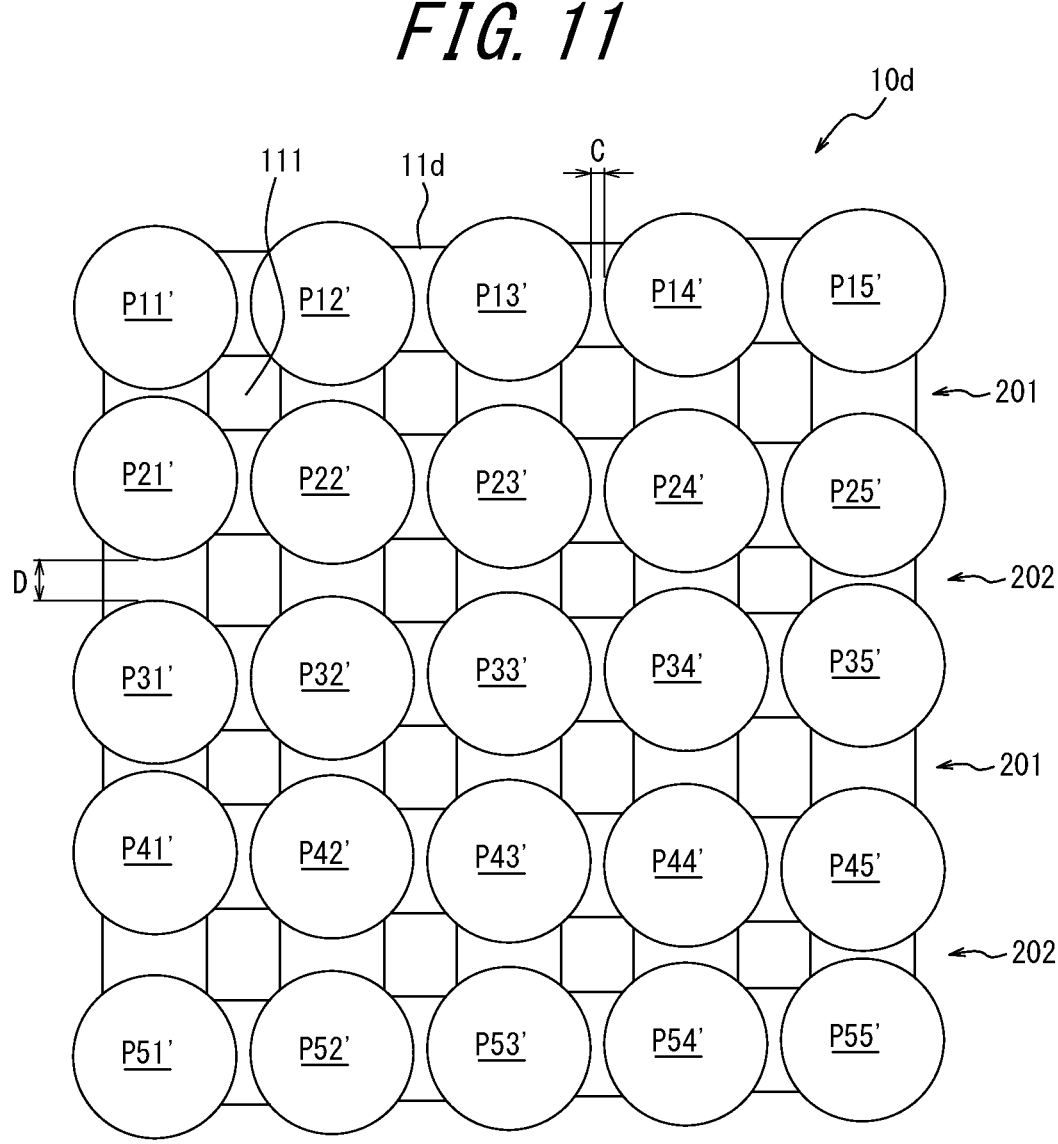
FIG. 11 is a top view of Modification 4 of the power generation module connected body illustrated in FIG. 1 in an unfolded state.

FIG. 11 is a top view of a power generation module connected body 10d according to Modification 4 of the power generation module connected body 10 in an unfolded state. The power generation module connected body 10d is the same as the power generation module connected body 10, except that power generation modules P' circular in a top view are used instead of the power generation modules P rectangular in a top view. In this case, the row direction width C is the shortest length of a connection portion 11d between power generation modules P' adjacent in the row direction, as illustrated in FIG. 11. Likewise, the column direction width D is the shortest length of the connection portion 11d between power generation modules P' adjacent in the column direction, as illustrated in FIG. 11. As long as the column direction width D can be defined, the power generation modules P' are not limited to be circular in a top view, and may have any other shape such as a polygon.

The above merely describes one of the disclosed embodiments, and a variety of modifications may be made within the scope of the claims. For example, while the arrangements of the power generation modules P and P', the connection portions 11 to 11d, and the like are described above using rows and columns, such rows and columns are defined for the purpose of illustration, and may be replaced with each other. Moreover, the upward direction and the downward direction are defined for the purpose of illustration, and may be replaced with each other. Although the above describes the power generation module connected bodies 10 to 10d in which the power generation modules P or P' are arranged in a matrix of 5 rows and 5 columns, the power generation modules P or P' may be arranged in a matrix of 2 rows or more and 2 columns or more.

Each of the connection portions 11 to 11d according to this embodiment preferably has the through region 111, but the through region 111 may be omitted.

In each of the connection portions 11 to 11d according to this embodiment, for example, the conductor layer 112 may be composed of a flexible printed circuit board (FPC) in which a conductor such as copper foil is sandwiched between insulators such as a base film and a cover film. In this case, each of the connection portions 11 to 11d need not include the protective layer 113 because the conductor layer 112 composed of an FPC has a protection function.

Figure 12A:
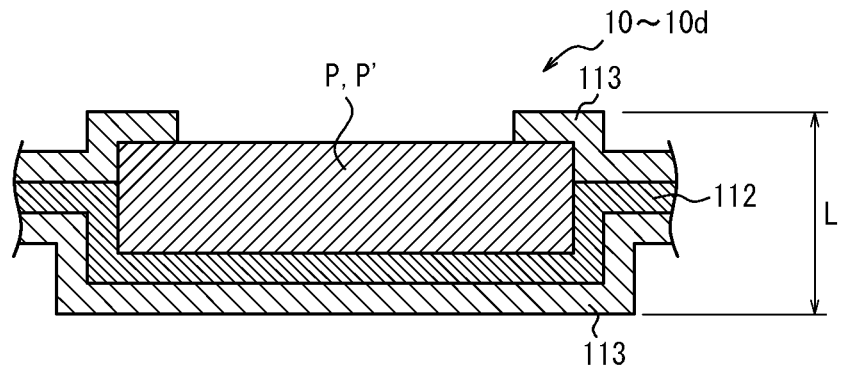
FIG. 12A is a partially enlarged sectional view of Modification 5 of the power generation module connected body illustrated in FIG. 1 in an unfolded state.
Figure 12B:
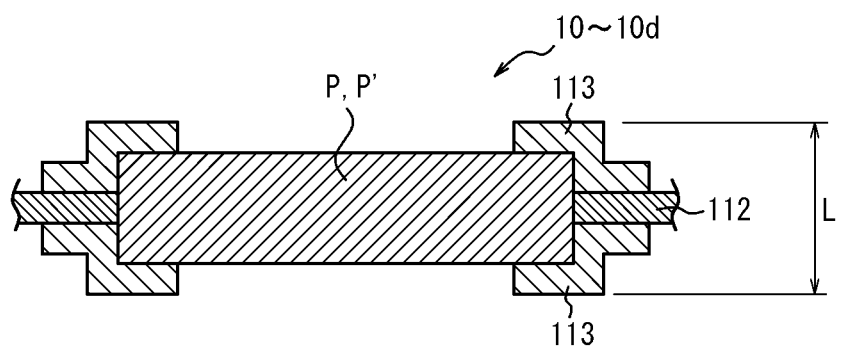
FIG. 12B is a partially enlarged sectional view of Modification 5 of the power generation module connected body illustrated in FIG. 1 in an unfolded state.
Figure 12C:
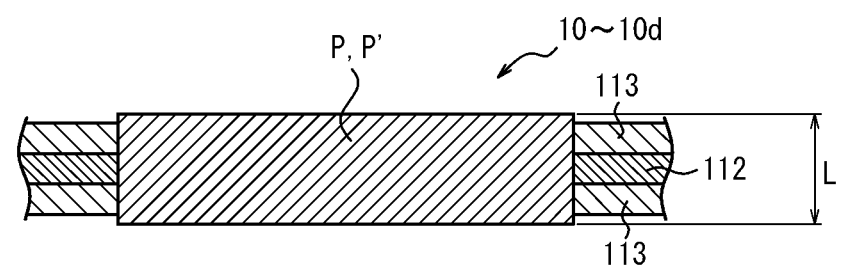
FIG. 12C is a partially enlarged sectional view of Modification 5 of the power generation module connected body illustrated in FIG. 1 in an unfolded state.

Alternatively, in the case where the conductor layer 112 is composed of an FPC, each of the connection portions 11 to 11d may include the protective layer 113 as illustrated in FIGS. 12A to 12C. FIGS. 12A to 12C each illustrate an example of the power generation module connected bodies 10 to 10d in which the conductor layer 112 is located to connect adjacent power generation modules P or P' near the vertical center. The protective layer 113 may be located to cover the power generation module P or P' excluding part of the front side as illustrated in FIG. 12A, located to cover the connecting part between the power generation module P or P' and the conductor layer 112 from above and below as illustrated in FIG. 12B, or located to cover the conductor layer 112 from above and below as illustrated in FIG. 12C. As mentioned above with reference to FIGS. 4A to 4C, in the case where the conductor layer 112 and/or the protective layer 113 is present above or below the power generation module P or P', the thickness L of the power generation module P or P' in the vertical direction is taken to be the thickness of the whole power generation module connected body 10 to 10d including the thickness of the conductor layer 112 and/or the protective layer 113.

The form of connection of the main body 20 to the power generation modules in the power generation device 1 according to this embodiment is not limited. For example, the main body 20 may be integrated with any of the power generation modules, or connected to an end of any of the power generation modules. The main body 20 may be removable from the power generation module.

The power generation module connected body according to this embodiment is not limited to be used together with the main body 20 to form the power generation device 1, and may be used independently of the main body 20. In detail, the power generation module connected body according to this embodiment may include, for example, an interface having the same functions as the external IF 26 of the main body 20 and, when an external device is connected directly to the interface, supply electric power to the connected external device.

As one aspect of the power generation modules according to this embodiment, photoelectric conversion modules including the above-mentioned solar cell panels may be used. As one aspect of the power generation module connected body according to this embodiment, a photoelectric conversion module connected body using the above-mentioned photoelectric conversion modules may be used. As one aspect of the power generation device 1, a photoelectric conversion device including the above-mentioned photoelectric conversion module connected body may be used.

Each structure described with regard to the power generation module connected body according to this embodiment is also applicable to any panel connected body including any thin panels not limited to power generation modules and any connection portion not limited to a connection portion including a conductor.

INDUSTRIAL APPLICABILITY

It is therefore possible to provide a panel connected body, a power generation module connected body, a photoelectric conversion module connected body, and a power generation device having improved storability in a folded state.

REFERENCE SIGNS LIST 1 power generation device
10, 10a, 10b, 10c, 10d power generation module connected body
11, 11a, 11b, 11c, 11d connection portion
12 power generation panel
20 main body
21 interface
22 booster circuit section
23 power generation module voltage detection section
24 AC adapter voltage detection section
25 rechargeable battery
26 external interface
27 charge/discharge control circuit
28 controller
30 AC adapter
31 power outlet
32 AC/DC converter
111 through region
112 conductor layer
113 protective layer
201 first type row
202 second type row
203 first type column
204 second type column
C row direction width
D column direction width
L thickness of power generation module in vertical direction
P, P' power generation module

The invention claimed is:

1. A panel connected body, comprising:
a plurality of thin panels arranged in a matrix of m rows and n columns, where $m \geq 3$ and $n \geq 3$, with at least 3 panels in each row and each column; and
a connection portion connecting the plurality of thin panels in a row direction and a column direction,
wherein the panel connected body is foldable between adjacent thin panels of the plurality of thin panels,
the connection portion has, alternately in the column direction, a first type row satisfying relationships $D_1 \geq 2L$ and $D_y \geq D_{y-1} + 2L$ and a second type row satisfying relationships $D_n \geq 2L$ and $D_y \geq D_{y+1} + 2L$, where $D_y$ is a length of the connection portion between thin panels adjacent in the column direction at a yth column, and L is a thickness of each of the plurality of thin panels in a vertical direction,
the connection portion has, alternately in the row direction, a first type column satisfying relationships $C_1 \geq 2L$ and $C_x \geq C_{x-1} + 2L$ and a second type column satisfying relationships $C_m \geq 2L$ and $C_x \geq C_{x+1} + 2L$, where $C_x$ is a length of the connection portion between thin panels adjacent in the row direction at an xth row,
in the connection portion, a first row is the first type row and a first column is the second type column, or the first row is the second type row and the first column is the first type column,
the plurality of thin panels are power generation modules, and
the thickness of each panel in the vertical direction is equal to or more than 10 μm and equal to or less than 3 mm.

2. The panel connected body according to claim 1, wherein the connection portion further has a through region passing through the connection portion in the vertical direction, at a position of an intersection point of folds in a state in which the panel connected body is folded between adjacent thin panels in the row direction and the column direction.

3. A power generation module connected body, comprising
the panel connected body according to claim 1,
wherein the connection portion includes a conductor electrically connecting the power generation modules.

4. The power generation module connected body according to claim 3,
wherein the connection portion is located along a bottom side of the power generation module, and further includes a conductor layer and a protective layer stacked in the vertical direction,
the conductor layer includes the conductor, and the protective layer is located closer to the bottom side than the conductor layer.

5. A photoelectric conversion module connected body, comprising the power generation module connected body according to claim 3, wherein the power generation modules are photoelectric conversion modules.

6. A power generation device, comprising:

the power generation module connected body according to claim 3; and a main body electrically connected to the power generation module connected body.

* * * * *